Feb. 10, 1970

D. D. BEATTIE 3,494,529

HYDRAULIC MOTOR FOR A RECIPROCATING GRIPPER

Filed Nov. 24, 1967

United States Patent Office 3,494,529
Patented Feb. 10, 1970

3,494,529
HYDRAULIC MOTOR FOR A RECIPROCATING GRIPPER
David Dowley Beattie, Nollamara, Western Australia, Australia, assignor to Sheeba, Industries Pty. Ltd., Nedlands, Western Australia, Australia, a corporation of Western Australia
Filed Nov. 24, 1967, Ser. No. 685,363
Claims priority, application Australia, Dec. 12, 1966, 15,159/66
Int. Cl. B65h 17/26
U.S. Cl. 226—141          4 Claims

ABSTRACT OF THE DISCLOSURE

A hydraulic motor for moving a flexible conduit relative to the motor, and having a carrier arm on which is mounted a gripping mechanism arranged to grip the conduit when the carrier arm moves in one direction and to release the conduit when the carrier arm moves in a second opposite direction, the carrier arm being reciprocated by a hydraulically operated cylinder and piston arrangement to move it in the first and second directions.

---

This invention relates to an improved hydraulic motor and in particular to one for use with a flexible conduit to move said conduit relative to said motor.

Accordingly the present invention resides in a hydraulic motor for use with a flexible conduit to move said conduit relative to said motor, comprising a carrier arm having a bracket member mounted thereon for supporting said conduit, a cam member mounted adjacent the end of the carrier arm so that the conduit passes between the bracket member and the cam member, said cam member being adapted to grip said conduit when said carrier arm is moved in a first direction and to slide on said conduit when said carrier arm is moved in a second opposite direction and hydraulically operated means for imparting a reciprocating motion to said carrier arm to move it in said first and second directions.

Preferably said hydraulically operated means comprise a cylindrical member having an inlet and an outlet adjacent one end thereof, a piston rod passing through the other end of said cylindrical member, a main piston head mounted on said piston rod and a pair of secondary piston heads connected together by a hollow rod member and spaced apart at a distance corresponding to the distance between said inlet and outlet, said main piston head and said pair of secondary piston heads being slidable in said cylindrical member, said main piston head being mounted between said pair of secondary piston heads and the said other end of the cylindrical member, said piston rod extending through the main piston head, the extension of said piston rod passing through said hollow rod member to allow said pair of secondary piston heads to be slidably mounted on said extension, and a tubular by-pass member connecting said space between the main piston head and said other end, with the space between said pair of secondary piston heads. The carrier arm is mounted on the end of the piston rod passing through said other end of the cylindrical member.

The invention may be better understood by reference to the following description of a preferred embodiment thereof as illustrated in the accompanying drawings in which.

Figure 1:
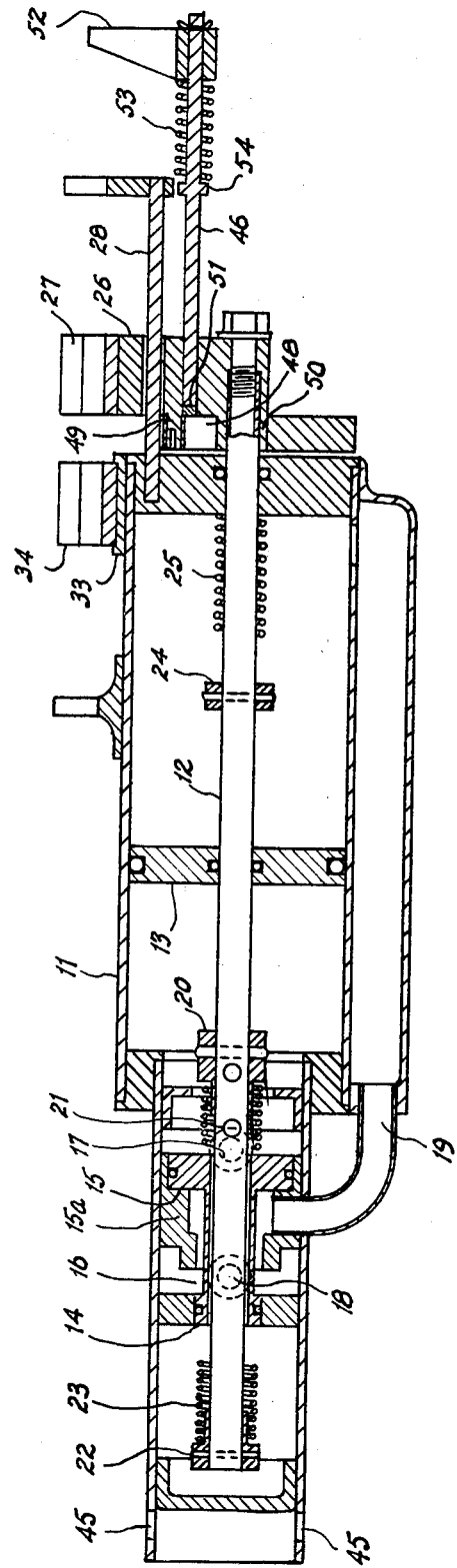
FIG. 1 is a sectional elevation of the hydraulically operated unit for use in the invention.

In this embodiment the motor is adapted to be connected in a sprinkler supply line between the tap or valve and the hose to which the sprinkler is attached, the tap being connected to the inlet and the hose to the outlet. The motor preferably comprises a cylindrical member 11 having a piston rod 12 passing through one end thereof and having a main piston head 13 mounted intermediate the end. Slidably mounted on the end of the piston rod 12 within the cylindrical member 11 is a pair of spaced piston heads 14 and 15 connected by a length of tube 16 of larger internal diameter than the piston rod 12. The cylindrical member 11 adjacent the pair of piston heads 14 and 15 is provided with inlet and outlet connections 17 and 18 respectively, which are spaced apart at a distance equal to the distance between the spaced pair of piston heads. A by-pass 19 connects the space between the pair of piston heads with the space between the main piston head and the end of the cylindrical member through which the piston rod 12 passes. The piston rod 12 is preferably provided at a point intermediate the main piston head 13 and the adjacent piston head 15 of the pair of piston heads with a stop member 20 against which a coil compression spring 21 is adapted to bear. The end of the piston rod adjacent piston head 14 of the pair of piston heads is also provided with a similar stop member 22 and compression spring 23. A further stop member 24 and an overrun compression spring 25 may be provided if desired on the portion of the piston rod 12 intermediate the main piston head 13 and the end of the cylindrical member 11 through which the piston rod passes.

The end of the piston rod 12 protruding from the cylindrical member 11 has a carrier arm 26 mounted thereon. The end of the cylindrical member 11 through which the piston rod 12 extends is provided with a guide rod 28 which passes through an opening in the carrier arm 26 so that the carrier arm is slidably mounted thereon. The carrier arm 26 has a mechanism 27 mounted thereon for moving the conduit, in this case the hose. The mechanism 27 is shown in greater detail in FIG. 2.

Figure 2:
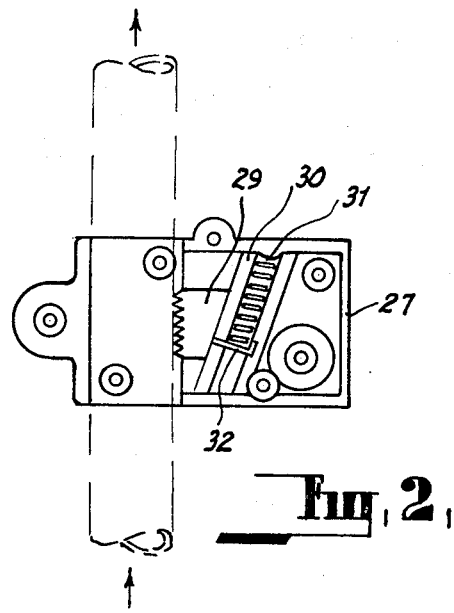
FIG. 2 is a detail section of the mechanism for moving the conduit.

The hose H is fed through the mechanism 27 in the direction of the arrow in FIG. 2. The mechanism comprises a cam member 29 so shaped that when the piston rod 12 moves outwards of the cylindrical member 11 the cam member slides along the surface of the hose, and when the piston rod moves inwards the cam member 29 grips the hose and moves it relative to the motor. In the embodiment shown in FIG. 2, the cam member 29 is substantially wedge shaped and is adapted to slide on a track 30 inclined to the direction of travel of the hose, the surface of the cam member 29 which engages the hose being provided with a series of serrations to enable it to grip the hose. The cam member 29 is biased by spring means 31 so as to be in a position to grip the hose, the spring means 31 bearing against a projecting lug 32 on the cam member 29. The cylindrical member 11 is also provided adjacent the end through which the piston rod protrudes with a bracket 33 on which a gripping mechanism 34 similar to mechanism 27 is provided. The cam members of the respective gripping members act in such a manner that when the cam member on the bracket 33 grips the hose H, the cam member on the carrier arm 26 slides in relation to the hose and vice versa.

Figure 3:
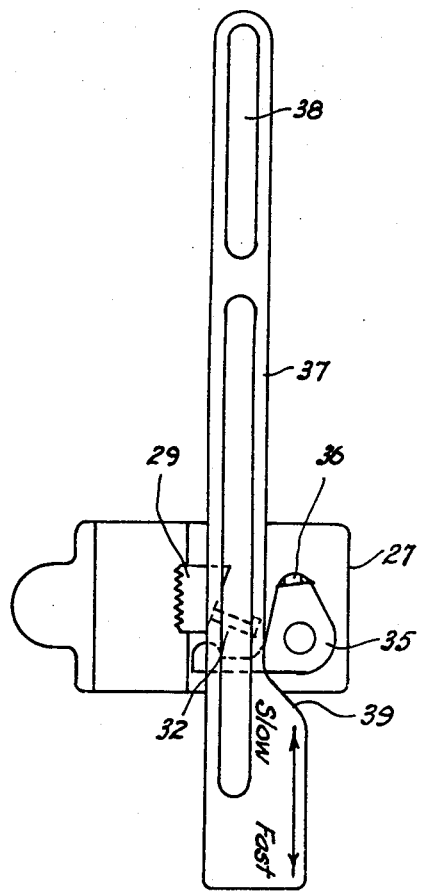
FIG. 3 is a detail view of the speed control unit.

As shown in FIG. 3 the mechanism 27 mounted on the carrier arm 26 is provided with a speed control unit which regulates the length of conduit passing through the gripper mechanism. The speed control unit consists of a substantially L-shaped release lever 35 mounted on the gripper mechanism 27 for rotation in a plane substantially at right angles to the direction of travel of the hose H, the axis of rotation being substantially at the junction of the legs of the L-shaped release lever. One of the legs of the L-shaped lever 35 is arranged so as to be normally substantially at right angles to the direction of travel of the hose H and situated forward of the projecting lug 32, whilst the other leg of the L-shaped lever 35 is arranged so as to be normally substantially parallel to the direction of travel of the hose, the free end of this leg being provided with an upstanding arm 36. A speed control arm 37 is slidably mounted on the mechanism 27, one end of the arm 37 being provided with an elongated slot 38 so that the arm 37 may be adjustably anchored to a convenient point of the cylindrical member 11, preferably on the gripper mechanism 34, the speed control arm being capable of movement in a direction parallel to the direction of travel of the hose. The speed control arm 37 is provided with a cam surface 39 which co-operates with the upstanding arm 36 on the release lever 35 to regulate the length of hose gripped by the cam member 29.

Figure 4:
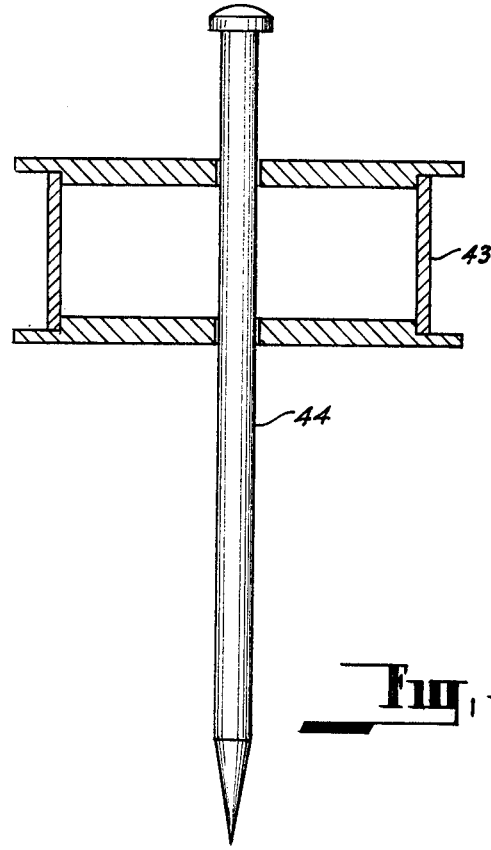
FIG. 4 is a section of a guide roller for guiding the conduit.
Figure 5:
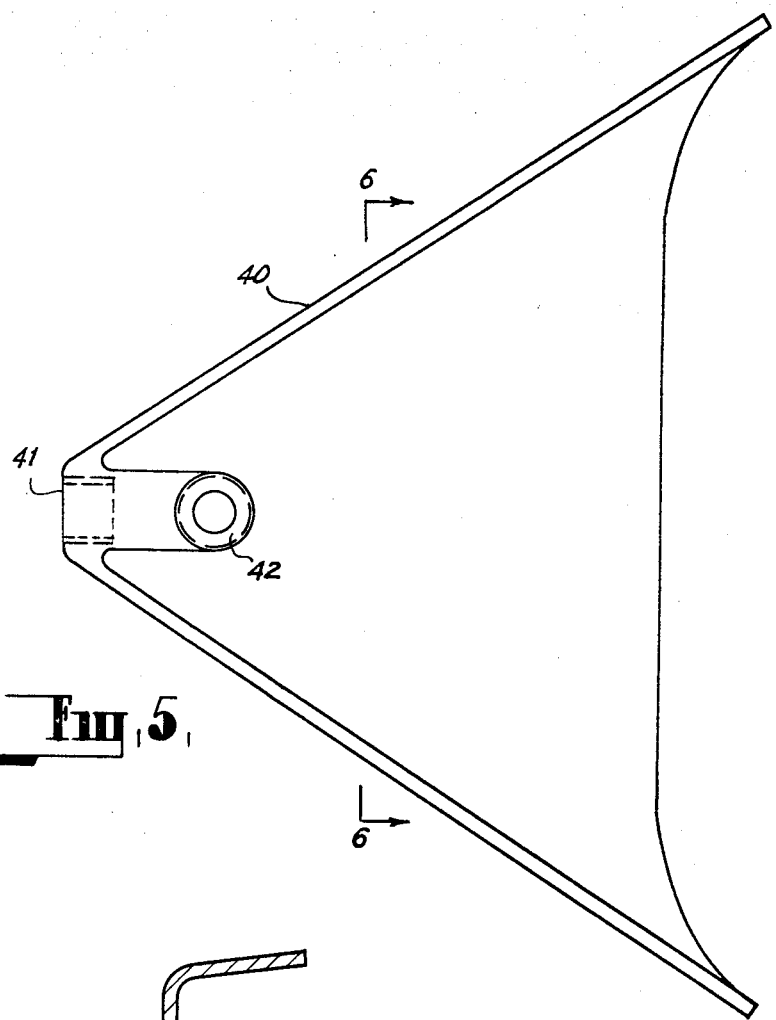
FIG. 5 is a plan view of a skid for use with the end of the conduit.
Figure 6:
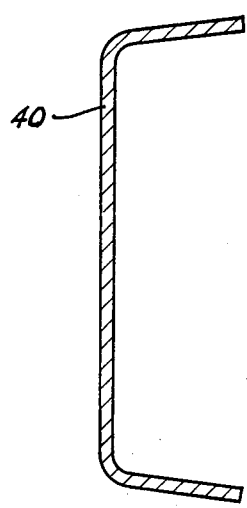
FIG. 6 is a section along the line 6—6 of FIG. 5.

In use in conjunction with a hose and sprinkler, the sprinkler is fitted with a skid or ski 40 as shown in FIG. 5 and in cross section in FIG. 6, the skid 40 having an inlet 41 for the hose and an outlet 42 onto which the sprinkler is fitted. The skid 40 allows the sprinkler to slide easily over the area to be watered. The inlet 17 of the motor is connected to the tap whilst the outlet 18 is connected to the hose. Should the sprinkler have to travel a path which is not straight a series of guide rollers 43 with anchor spikes 44 as shown in FIG. 4 are provided, the spikes 44 being driven into the ground to locate the guide rollers 43 in such positions as may be necessary to guide the sprinkler along the desired path. The motor itself is also preferably anchored to the ground by means of a spike driven in the ground through an aperture 45 provided in the end of the cylindrical member.

The operation of the motor is as follows: As water enters through inlet 17 it first fills the cylindrical member 11 with water and the water then exerts a pressure on the main piston head 13 forcing water in the space between the head 13 and the end of the cylinder through which the piston rod 12 protrudes, into the by-pass 19 and out through the outlet 18. At the same time, the piston rod 12 moves outwards causing:

(a) The cam member 29 on the carrier arm 26 to slide along the surface of the hose;

(b) Water in the by-way 19 to exert a pressure on one face of the piston head 15. Water from the inlet 17 exerts a pressure on the other face of the piston head 15 which because it has a slightly larger effective surface area has therefore a slightly greater force acting on it thus tending to force and keep the piston head 15 back against the piston seat 15a. The pair of piston heads thus tend to move in the opposite direction to the main piston head 13. When the compression spring 23 at the end of the piston rod bears against the adjacent piston head 14 it causes the piston head 14 and 15 to move slowly until the forces on both side of the piston head 15 are equalised, the piston head 14 and 15 then being caused to snap past the inlet and outlet respectively by sliding on the piston rod. The incoming water then flows into the space between the pair of piston heads 14 and 15 and into the by-pass 19 thus reversing the flow of water therein. This applies pressure to the other side of the main piston head causing it to move. This results in the piston rod 12 moving inwards causing:

(i) The cam member 29 of the gripper mechanism 27 to grip the hose and move it relative to the motor, which results in the sprinkler being moved a small distance;

(ii) The water between the main piston head 13 and its adjacent piston head 15 to flow through the space between the piston rod 12 and the tubular connecting member 16 and out through the outlet 18;

(iii) The compression spring 21 mounted on the piston rod 12 intermediate the main piston head 13 and the piston head 15 to bear against the adjacent piston head 15 causing the pair of piston heads 14 and 15 to snap past the inlet 17 and the outlet 18.

The cycle then restarts as previously described.

The motor may also be provided with an automatic cut-off device actuated by the sprinkler abutting against it when the hose has been pulled through the motor. The cut-off device consists essentially of a shut-off bar 46 mounted for slidable movement on the carrier arm 26, the shut-off bar extending in a direction substantially parallel to the direction of travel of the hose and outwardly from the adjacent end of the cylindrical member 11. A stop plate 47 having a slot 48 is also slidably mounted on the carrier arm 26 in a position adjacent the end of the cylindrical member 11, the top of the slot 48 engaging a projecting pin 49 on the carrier arm 26, the lower portion of the slot 48 engaging a boss 50 on the carrier arm 26. The end of the shut-off bar 46 adjacent the slot 48 in the stop-plate 47 is provided with a pusher arm 51 whilst the other end of the bar 46 is provided with a shut-off guide 52 which is biased to a position at the end of the bar 46 by means of a coiled compression spring 53 and stop 54.

The operation of the automatic cut-off device is as follows:

When the sprinkler abuts against the shut-off guide 52 as the piston rod 12 is being withdrawn from the cylindrical member 11, movement of the shut-off bar 46 is prevented whilst the piston 12 and the carrier arm 26 continue their outward movement. Consequently the pusher arm 51 strikes the stop plate 47 and pushes the slot 48 off the projecting pin 49 allowing the stop plate to fall so that the top of the slot 48 now rests on the piston rod 12 between the boss 50 and the end of the cylindrical member 11 and thus prevents the piston rod from returning to its position inside the cylindrical member, resulting in the pair of piston members 14 and 15 remaining in a position in which the inlet 17 is located between them. The motor is thus prevented from operating. The shut-off guide 52 is spring loaded so that should the sprinkler be located at a distance less than the stroke of the main piston head 13 from the guide 52, then continued movement of the piston rod 12 outwards will not result in damage to the sprinkler or the hose due to pressure exerted by the shut-off guide.

I claim:

1. A hydraulic motor for use with a flexible conduit to move said conduit relative to said motor, comprising a carrier arm having a bracket member mounted thereon for supporting said conduit, a cam member mounted adjacent the end of the carrier arm so that the conduit passes between the bracket member and the cam member, said cam member being adapted to grip said conduit when said carrier arm is moved in a first direction and to slide on said conduit when said carrier arm is moved in a second opposite direction, and hydraulically operated means for imparting a reciprocating motion to said carrier arm to move it in said first and second directions characterised in that said hydraulically operated means comprise a cylindrical member having an inlet and an outlet adjacent one end thereof, a piston rod passing through the other end of said cylindrical member, a main piston head mounted on said piston rod and a pair of secondary piston heads connected together by a hollow rod member and spaced apart at a distance between said inlet and outlet, said main piston head and said pair of secondary piston heads being slidable in said cylindrical member, said main piston head being mounted between said pair of secondary piston heads and the said other end of the cylindrical member, said piston rod extending through the main piston head, the extension of said piston rod passing through said hollow rod member to allow said pair of secondary piston heads to be slidably mounted on said extension, and a tubular by-pass member connecting said space between the main piston head and said other end, with the space between said pair of secondary piston heads, said carrier arm being mounted at or near the end of the piston rod passing through said other end of the cylindrical member.

2. A hydraulic motor as claimed in claim 1 wherein a gripping mechanism is mounted on said cylindrical member for gripping said conduit, said gripping mechanism comprising a further cam member, said further cam member being arranged to act so that when the cam member on the carrier arm slides in relation to the conduit, said further cam member grips said conduit and vice versa.

3. A hydraulic motor as claimed in claim 2 having an automatic out-off device, comprising a shut-off bar mounted for slidable movement on the carrier arm, the shut-off bar extending in a direction substantially parallel to the direction of travel of the conduit and outwardly from said other end of the cylindrical member; a stop plate having a slot, said stop plate being slidably mounted on the carrier arm and located adjacent the other end of said cylindrical member, the top of said slot engaging a projecting pin on the carrier arm, the lower portion of the slot engaging a boss on the carrier arm, the end of the shut-off bar adjacent the stop plate being further provided with a pusher, arm, the other end of said shut-off bar being provided with a shut-off guide which is spring biased to a position at said other end of said shut-off bar.

4. A hydraulic motor as claimed in claim 2 having a speed control unit comprising a substantially L-shaped release lever mounted on said gripping mechanism for rotation in a plane substantially at right angles to the direction of travel of the conduit, the axis of rotation being substantially at the junction of the legs of the L-shaped release lever, one of the legs of the L-shaped lever being arranged so as to be normally substantially at right angles to the direction of travel of the conduit, whilst the other leg of the L-shaped lever is arranged to be normally substantially parallel to the direction of travel of the conduit, the free end of said other leg being provided with an upstanding lug, the gripper mechanism being further provided with a speed control arm slidably mounted thereon, one end of the arm being provided with an elongated slot so that the arm may be adjustably anchored on said cylindrical member, the speed control arm being provided with a cam surface which co-operates with said upstanding lug to regulate the length conduit gripped by the cam member.

References Cited

UNITED STATES PATENTS

| | | | |
|---|---|---|---|
| 2,788,120 | 4/1957 | Benjamin | 226—165 |
| 3,128,028 | 4/1964 | Crafford | 226—165 X |

RICHARD A. SCHACHER, Primary Examiner

U.S. Cl. X.R.

226—149, 165